Sept. 26, 1939.    R. E. KELLER    2,174,191
AUTOMATIC TRANSMISSION
Filed March 21, 1934    3 Sheets-Sheet 1
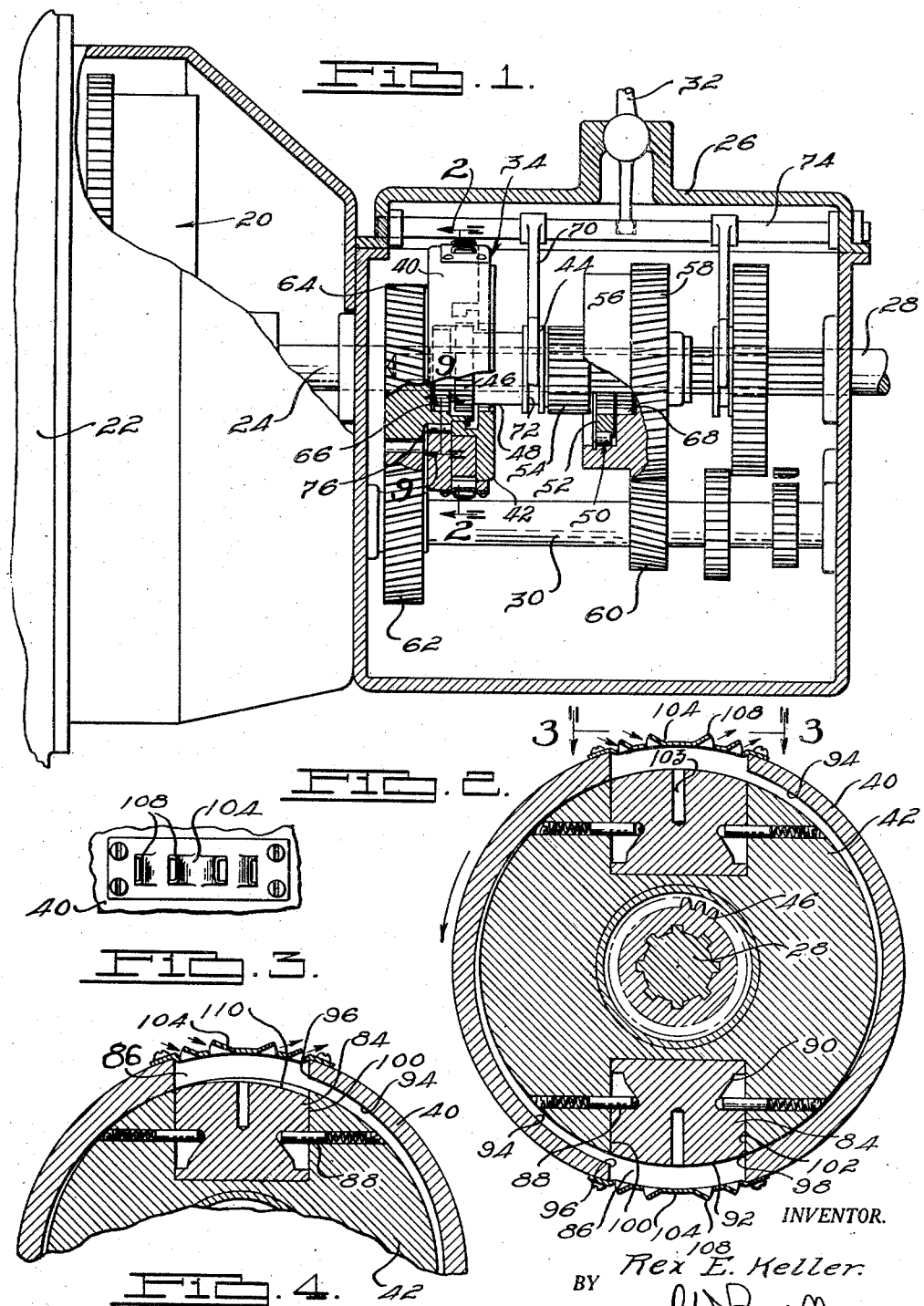
INVENTOR.
Rex E. Keller.
BY
ATTORNEY.

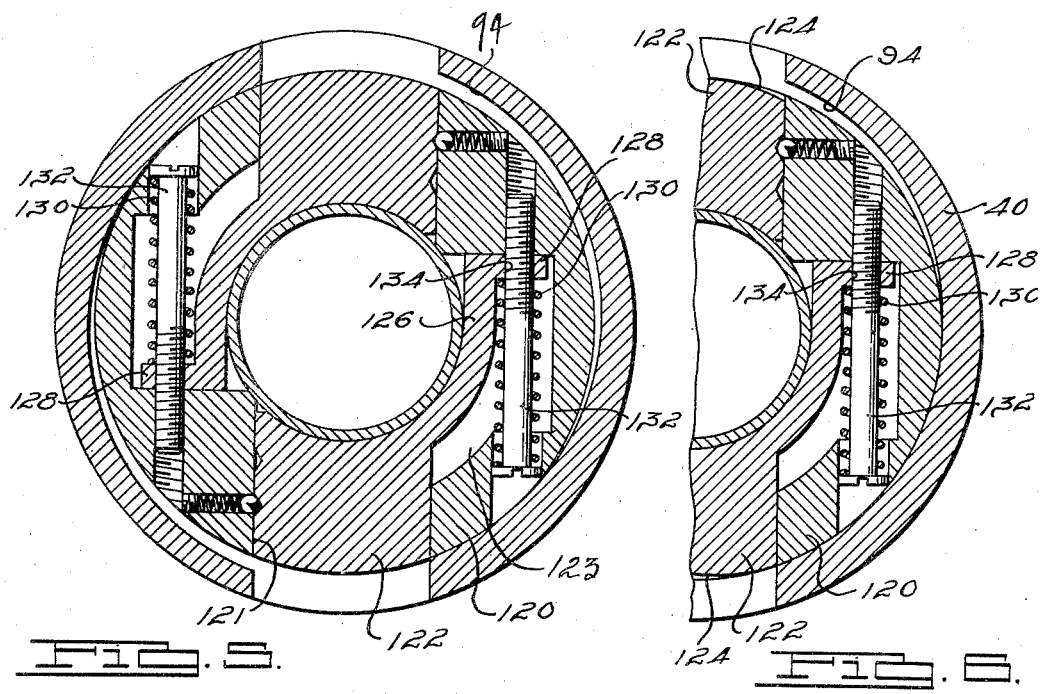
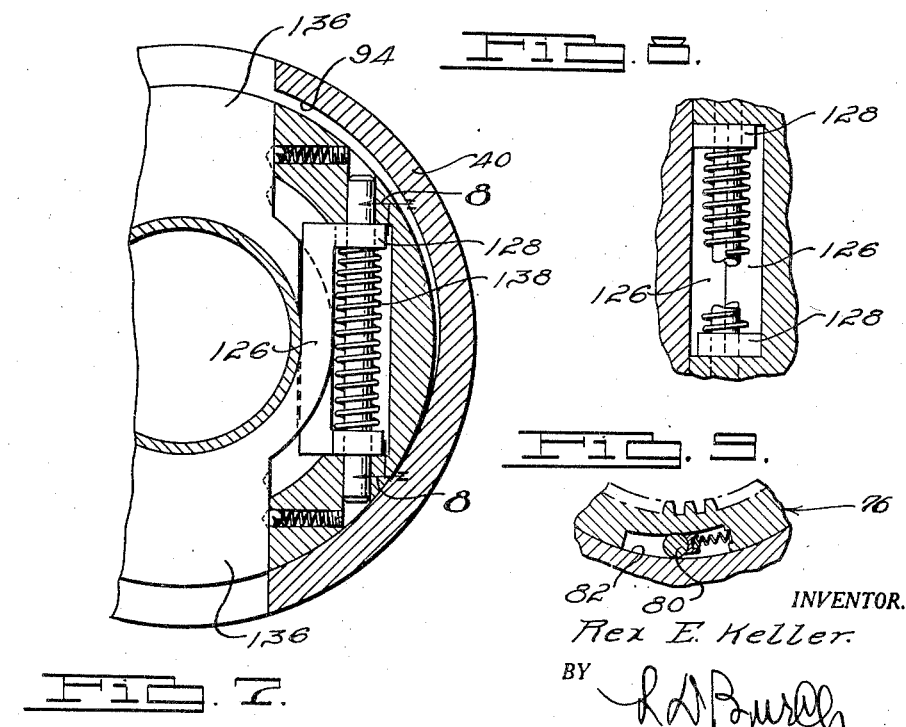

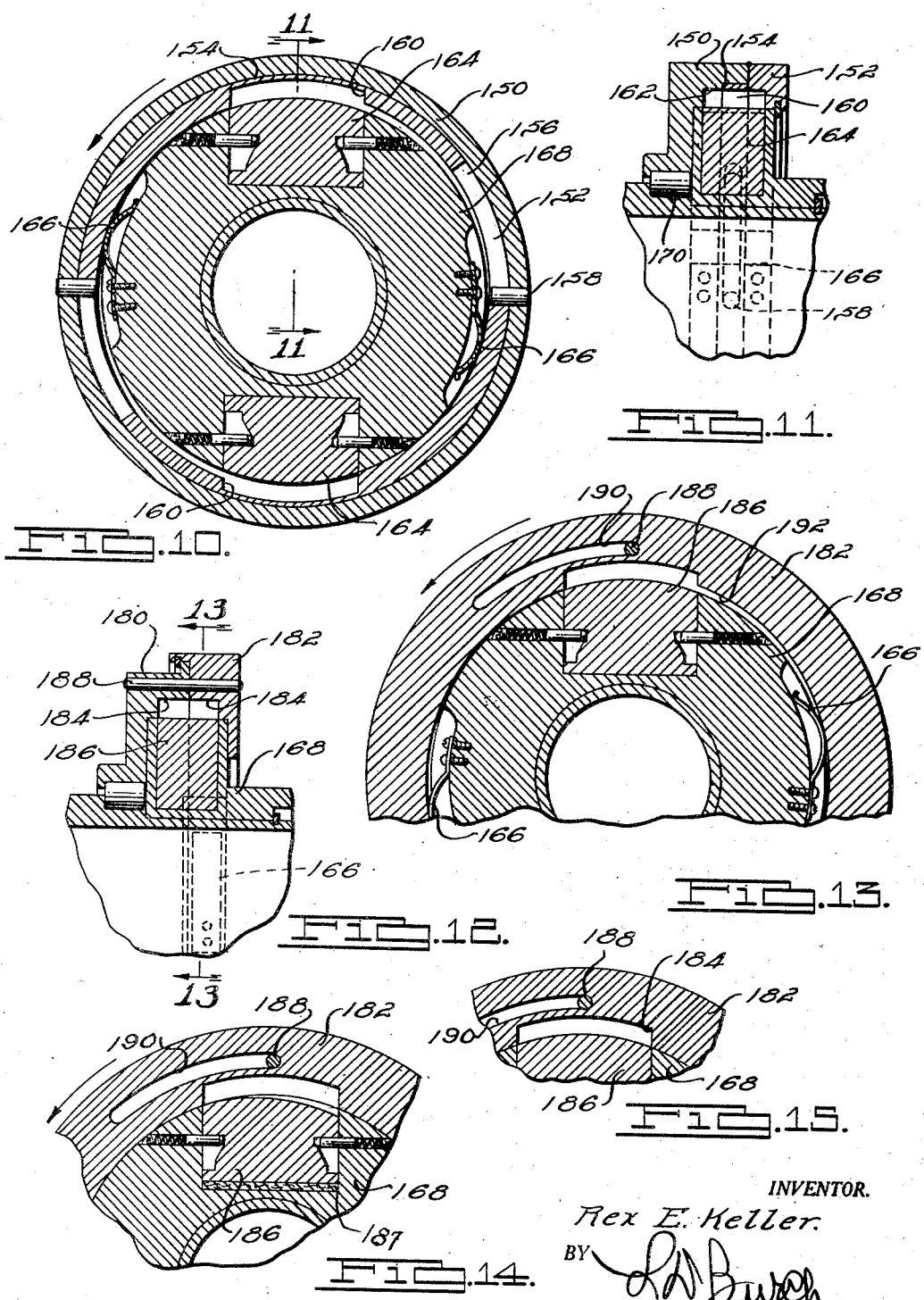

Patented Sept. 26, 1939

2,174,191

UNITED STATES PATENT OFFICE 2,174,191

AUTOMATIC TRANSMISSION

Rex E. Keller, Beverly Hills, Calif.

Application March 21, 1934, Serial No. 716,602

9 Claims. (Cl. 192—105)

This invention relates to automatic transmissions or speed changing mechanisms, and, as illustrated, is particularly adapted to devices of that sort operable for effecting changes in the ratio of the driving connection between a driving shaft and a driven shaft. More particularly, this invention has reference to means whereby the operation of such devices may be controlled or be made operable responsive to certain factors or conditions of operation of the device itself or of a transmission mechanism in which such a device may in practice be incorporated.

For purposes of illustration, I have shown my invention as applied to a centrifugally actuated clutch having a driving member, a driven member, a locking bolt carried by one of said members and operable responsive to changes in centrifugal force resulting from rotation of said clutch member at different rates for interconnecting and disconnecting said clutch members to effect changes in the ratio of a driving connection between a driving shaft and a driven shaft to which said clutch members may be connected, with means for preventing the operation of said clutch to increase the ratio of the driving connection between said shafts until the rotative speeds of said clutch members have been first brought to approximately synchronous speeds to permit which an overrunning clutch is provided which is disposed in the initial driving connection between said shafts to permit one of said clutch members to be decelerated without directly affecting the speed of the other of said clutch members.

An object of the invention, therefore, is to provide an automatic speed changing mechanism with means whereby the operation of said mechanism may be controlled incidental to the operation of a machine in which the same may be incorporated.

Other objects and advantages will be apparent from a reference to the following specification taken in conjunction with the accompanying drawings of which there are three sheets and in which:

Fig. 1 is a vertical longitudinal view, partly in section, illustrating the application of my invention to a more or less conventional change speed gearing of the selective type;

Fig. 2 is a vertical cross sectional view through the centrifugally actuated clutch of the automatic speed changing mechanism, taken in a plane on the line 2—2 of Fig. 1;

Fig. 3 is a detail view taken in a plane on the line 3—3 of Fig. 2;

Fig. 4 is a view similar to Fig. 2 and illustrating a modified form of clutch construction;

Figs. 5, 6 and 7 are views illustrating further modified forms of a centrifugally actuated clutch;

Fig. 8 is a sectional view taken in the plane on the line 8—8 of Fig. 7 and illustrating a detail thereof;

Fig. 9 is a cross sectional view portion of an overrunning clutch taken in a plane on the lines 9—9 of Fig. 1;

Figs. 10, 12, 14 and 15 are views similar to Fig. 2 and illustrating further modifications of the invention;

Fig. 11 is a detail view of the modification illustrated in Fig. 10 and taken in a plane on the line 11—11 thereof; and Fig. 13 is a detail view of the modification shown in Fig. 12 and taken in a plane on the line 13—13 thereof.

Referring now to Fig. 1 of the drawings, there is shown, partially in vertical section, a change speed gearing of the selective type such as are used in automotive vehicles, disposed rearwardly of a main clutch 20 which affords a breakable driving connection between the engine, indicated generally at 22, and the driving shaft 24 of the change speed gearing indicated generally at 26, which, in general, includes a driven or propeller shaft 28, a countershaft 30, gearing associated with said shafts, a manually operable shift lever 32 for effecting selective changes in the gearing to provide changes in the ratio of the driving connection between said shafts and, indicated generally at 34, a centrifugally actuated clutch, operable for effecting changes in the ratio of the driving connection between said shafts responsive to certain conditions of operation of the transmission and associated mechanism.

The automatic speed changing mechanism, in general, comprises a drum-shaped clutch member 40, affixed to the driving shaft 24 for rotation therewith, a core clutch member 42, nested within the drum-shaped clutch member 40 and adapted to be operatively connected to the driven shaft 28 by a clutch sleeve 44 splined to shaft 28 and having a toothed clutch element 46 at one end thereof engageable with an internal set of teeth 48 provided on the core clutch member 42, an overrunning clutch 50 of the type illustrated in Fig. 9, having as one element thereof an internal toothed clutch member 52 adapted to be coupled with a toothed clutch element 54 provided on other end of the clutch sleeve 44, the driving element of the overrunning clutch being provided by an annular flange 56, shown as formed integral with a gear 58 which is constantly in mesh with a gear 60 of countershaft gear cluster 30, a gear 62 of which is in constant mesh with a gear 64 affixed to the driving shaft 24 to rotate therewith, so that at such time as toothed clutch element 54 is coupled with internal toothed clutch member 52, a one-way driving connection between the driving and the driven shafts is provided, whereby the rotation of the driven shaft 28 may be initiated, together with core clutch element 42, which at such time is operatively connected to said driven shaft because of engagement of the teeth of element 46 with teeth 48.

Both the gear 64 and the gear 58 are provided with toothed clutch elements 66 and 68, respectively, which are adapted to be coupled with the toothed clutch elements provided on the clutch sleeve 44 for locking the driven shaft 28 to either of said gears for rotation therewith. A yoke 70, running in a groove 72 provided in the clutch sleeve 44, is fixed to a shifter rod 74 with which the shift lever 32 is engageable for shifting the same to selectively connect the clutch sleeve 44 to the toothed clutch elements associated with the gears 64 and 58. An overrunning clutch 76, like that disclosed in Fig. 9, may, if desired, be provided between the clutch drum 40 and drive gear 64 so that the clutch drum may overrun the same. The overrunning clutches 50 and 76 may be of the roller type, like that disclosed in Fig. 9, in which a spring-pressed roller 80 is biased into the restricted portion of an eccentric raceway 82 formed between oppositely disposed surface portions of two clutch members for locking the same for rotation in one direction and to permit free rotation of each in a separate direction without carrying the other clutch member along with it.

While the core member 42 is shown as being operatively associated with the driven shaft, the same may be associated with the driving shaft, and the drum clutch member 40 may also be connected to the driven shaft, since the operation of the centrifugally actuated locking member will be substantially the same in either case. However, as shown, the centrifugally actuated locking member comprises a locking bolt 84 carried by the core clutch member 42 which is operatively connected to the driven shaft and which is movable under the action of centrifugal force resulting from rotation of the core to extend into a bolt-engaging recess 86 provided in the drum-shaped clutch member 40 for interconnecting the same. The movement of the bolt 84, one or more of which may be used, is opposed by one or more spring-pressed poppets 88 shown as being carried by the core clutch member 42 and acting on cam or pitched surfaces 90 provided in the sides of the bolt 84. Outward movement of the bolt 84 under the action of centrifugal force will, on account of the pitch of the surfaces 90, act to compress the spring of the poppets 88 since the same will have to travel up the face of the pitched surface 90 to permit the outward movement of the bolt 84.

The spring-pressed poppets 88 will also, on account of the pitch of the surfaces 90, operate to move the bolt 84 inwardly and against the action of centrifugal force when the same falls below a predetermined amount. The force with which the spring-pressed poppets bear against the pitched surfaces 90 of the bolt 84 may be varied to select the speeds of rotation of the core clutch member 42 at which the bolt moves inwardly and outwardly responsive to changes in centrifugal force resulting from rotation of the core clutch member 42 at different rates.

When the clutch sleeve 44 has been shifted to the right to connect the clutch member 52 of the overrunning clutch 50 to the driven shaft, the rotation of the latter will be initiated, but at a lower rate than that of the driving shaft, with the result that a relative rotation will exist between the drum and core clutch members 40 and 42 which are connected to each of the shafts respectively. To prevent the bolt 84 from moving into any one of the bolt-engaging recesses 86 until the rotative speeds of the core and drum clutch members are approximately synchronous, the inner surface of the drum 40 against which the face 92 of the bolt 84 bears when the bolt tends to move outwardly under the action of centrifugal force, is provided with an eccentric groove or beveled surface 94 so that the shoulder or stop 96 provided at the trailing edge of the recess 86 is receded or radially offset with respect to a shoulder or stop 98 provided at the leading edge of the recess 86.

If the drum clutch member 40 is overrunning the core clutch member 42 in the direction indicated by the arrow in Fig. 2 and at a substantial rate, bolt 84 will not be in alignment with the bolt-engaging recess 86 for a sufficient length of time to permit the leading edge of the bolt 100 to engage shoulder 96, since the same is receded or radially offset with respect to the leading edge of the bolt 84 at that instant before the trailing edge 102 of the bolt is moved out of engagement with the under side of the shoulder 98, as a result of which the bolt 84 will jump the recess 86, and the face 92 will ride on the eccentric groove 94. Thus the bolt 84 will not be moved into bolt-engaging recess 86 until the same are in alignment for a sufficient length of time to permit the bolt 84 to move outwardly so that the leading edge 100 may engage the shoulder or stop 96. This condition may be brought about by reducing the rotative speed of the drum clutch member 40 to approximately that of the core clutch member 42, which may be effected by a temporary closing of the throttle controlling the speed of the engine.

Since the bolt 84 will continue to jump the bolt-engaging recess 86 until the rotative speeds of the drum and core clutch members are approximately synchronized, it will be appreciated that after the speed of rotation of the core 42 has been brought to that point sufficient to tend to move the bolt 84 outwardly, that the bolt 84, in jumping the bolt-engaging recesses 86, will impinge upon the surface of the eccentric groove 94. If the drum 40 is overrunning the core 42 by a substantial amount and the core 42 is rotating at a rate in excess of that required to move the bolt 84 outwardly, the jumping of the bolt 84 over the bolt-engaging recesses 86 may produce a considerable amount of noise. To aid in eliminating this noise, the drum 40 may be provided with a plate 104 provided with a plurality of apertures 106 therethrough and having baffles 108 struck out from the plate 104 for deflecting oil into the bolt-engaging recess through said apertures upon rotation of the clutch drum 40, which oil will tend to cushion the impact of the bolt 84 upon the surface of the eccentric grooves 94. The baffles 108 are shaped so as to deflect the oil in which the clutch unit 34 is immersed in operation, into the bolt-engaging recesses 86 and to permit the same to escape therefrom. Some of the oil will, however, accumulate within the eccentric groove 94 and form an oil pocket which will tend to cushion the impact of bolt 84 upon the surface of the eccentric groove 94.

In the modification illustrated in Fig. 4, the bolt 84 is shown as provided with an eccentric face 110, the low portion of which begins at the leading edge 100 of the bolt so that the possibility of the same engaging the shoulder 96 of the bolt-engaging recess when the drum 40 is overrunning the core 42, is further reduced. The eccentric face 110 on the bolt 84 in addition to the eccentric groove 94 tends to reduce the noise attending the impact of the bolt upon the surface of the eccentric groove 94 as the face of the bolt 84 is complementary to the surface of the groove 94, as a result of which the initial area of contact between the bolt 84 and the eccentric groove 94 will be over a relatively large area; that is, the edge of shoulder 96 will not strike the face 110 of the bolt 84 each time bolt 84 jumps the recess 86.

In Fig. 5 there is shown a modified form of construction in which the core clutch member 120 is provided with a groove 121 for accommodating a bolt 122 and an offset grooved portion 123 for accommodating a leg 126 formed integral with the bolt 122 and having a flange 128 between which and the head of a pin 132 a spring 130 is confined for biasing the bolt 122 to its inward position. Pin 132, threadedly secured to the core 120 and passing through an aperture 134 in the flange 128 of the leg 126 may be adjusted for varying the tension of the spring 130 and is adapted for securing the same in position.

In the modification disclosed in Fig. 6, the face 124 of the bolt 122 may be tapered to cooperate with the eccentric groove 94 internally provided in the drum clutch member 40 like the construction of the bolt 84 disclosed in Fig. 4.

In the modifications disclosed in Figs. 7 and 8, the bolts 136 may be provided with a leg 126 on each side thereof so that the flange portions 128 of two oppositely disposed bolts 136 may likewise be oppositely disposed and have a spring 138 disposed between the flange 128 for holding the bolts 136 in their inner or retracted position. The face of the bolt 136 may be as shown or may be provided with a bevel such as bevel 110 with which bolt 84, disclosed in Fig. 4, is provided.

In the modifications disclosed in Figs. 10 and 11, the drum clutch member comprises two shell or cylinder members 150 and 152, the latter of which is provided with an annular flange 154 which fits within a portion of the shell member 150 and which is provided with one or more slotted openings 156, into each of which a pin 158 secured to the shell member 150 extends for limiting the movement of shell member 152 relative thereto. In this instance the shell member 152 is provided with a recessed portion 160 which together with a similar recessed portion 162 provided in shell member 150 form a bolt-engaging recess for receiving a centrifugally actuated bolt 164 which bolt is of a width greater than either of the portions 160 or 162 so that unless the same are in alignment, the bolt 164 will be unable to engage with either of said recessed portions. It will be noted that the pins 158 on member 150 operating in slots 156 maintain the shell members 150 and 152 in axially abutting relation.

A spring clip 166, secured to a clutch core 168, is frictionally engageable with shell member 152 so that when shell member 150, which is operatively connected to a driving shaft such as by an overrunning clutch indicated generally at 170, and core clutch member 168 is rotating with a driven shaft and at a lower rate of rotation than clutch shell 150, the spring clip 166 will drag on the clutch shell 152 and cause a limited relative rotation to taken place between shell 152 and shell 150 so that pins 158 will move to the opposite end of the slotted openings 156, in which event the portions 160 and 162 of the bolt-engaging recess will be moved out of alignment, with the result that bolt 164 cannot be projected into the same. Upon a deceleration of the speed of clutch shell 150, the same will move relative to clutch shell 152 to a position where pin 158 is returned to the position in which it is shown in Fig. 10, in which event the portions 160 and 162 of the bolt-engaging recess will be in alignment, whereby bolt 164 may be projected into the same under the action of centrifugal force.

In the modifications illustrated in Figs. 12 to 15, inclusive, the drum portion of the clutch is composed of two shell members 180 and 182, each of which is provided with a portion 184 of a recess adapted to receive a centrifugally actuated bolt 186 carried by a clutch core such as 168. In this instance a pin 188, carried by shell member 180, extends through a slotted opening 190 in shell member 182 and permits relative rotation to occur between the two shell members, the pin 188 limiting the amount of such relative rotation. Each of the shell members 180 and 182 may be provided with an eccentric groove 192 similar in construction and function to eccentric groove 94, disclosed in the modifications illustrated in Figs. 1 to 7, inclusive. The eccentric groove 192, like the eccentric groove 94, enables the shoulders provided on the opposite edges of the bolt-engaging recesses, such as the shoulder 98 of Fig. 2, to provide a positive stop for engagement with the edge of the bolt in the event that the rotative speed of the clutch drum should decelerate below that of the clutch core before one of the centrifugally actuated bolts is projected into one of the bolt-engaging recesses. If the rotative speed of the clutch drum should fall below that of the clutch core, relative rotation between the core and drum would exist in a direction opposite to that indicated by the arrow in Fig. 2, and for that reason the shoulder 98 on the drum would first come into contact with the edge 102 of the bolt, since the same would then be traveling down the face of the eccentric groove 94, or in the direction indicated by the arrow in Fig. 2.

It will be appreciated that in any of the modifications shown, the centrifugally actuated bolt may be provided with a surface like that with which it is shown in Fig. 15, or it may also be provided with an eccentric surface such as 110 with which it is shown in Fig. 4. If the centrifugally actuated bolt is provided with an eccentric surface, the shell member 182 need not have an eccentric groove, but may be constructed without such and according to the disclosure of Fig. 14.

Bolt 84 in Fig. 2 preferably may be provided with an opening 103 adapted for receiving the head of a suitable tool whereby the bolt 84 may be removed from the groove in which it is slidably mounted in core 42. If desired, the bottom of the bolts may have secured thereto a rubber or fibrous plate 187 as illustrated in Fig. 14 which would act as a seal between the bolt and the groove in which it is slidable so that a vacuum would exist on the under side of the bolt to oppose movement of the same under the influence of centrifugal force and to cushion the impact of the bolt and eliminate the noise of such impact when the bolt moves to its retracted position.

It will be observed that in only some instances has the internal surface of the clutch drum been provided with a beveled or eccentric surface, while in others the beveled or tapered surface has been provided upon the face of the slidable bolt. So far as the operation of the clutch is concerned, the beveled or tapered surface may be formed either on the internal surface of the drum, or the face of the slidable bolt, or in part on each. For quietness in operation, the pitch of the beveled or tapered surface should not be steep with respect to the internal annular surface of the drum. If the relative rotation between the two clutch members is relatively high, as where the change in the ratio between the drive afforded by the one-way clutch and that afforded by the centrifugally actuated clutch is large, the pitch of the beveled surface with respect to the annular surface of the drum may be relatively small.

In determining the desirable pitch of the cam face of the bolt or drum, such factors as the relative speeds of the drum and core at which overrunning takes place, while the bolt tends to move outwardly responsive to centrifugal force and the difference between the length of the bolt and the recess, must be taken into consideration. When the cam surface is cut upon the face of the bolt, that portion thereof on the trailing edge side of the center line of the bolt should be disposed closer to the internal surface of the drum than that portion thereof on the leading edge side of the center line of the bolt so that when the high point of the cam face is riding upon the internal surface of the drum, which occurs when relative rotation exists between the drum and core, above the speed at which the bolt tends to fly outwardly, the other portion of the cam face will not be in contact with the internal surface of the drum. The pitch of the bevel on the internal surface of the drum should be such as to give a corresponding action; that is, the cam surface is cut on the internal surface of the drum in such a manner as to reduce the shoulder formed at the trailing edge of the recess so that when relative rotation between the core and the drum exists, the leading edge of the bolt will jump such shoulder, being moved away from the same in passing over the high shoulder provided at the leading edge of the recess.

While several specific embodiments of the invention have been illustrated and described, it must be appreciated that many modifications may be made in the construction thereof without departing from the scope of the invention, and for that reason I do not desire to be limited to any particular form or arrangement except in so far as such limitations are included in the following claims:

I claim:

1. Transmission mechanism having a centrifugally actuated clutch having a drum-shaped clutch member, a core clutch member adapted to be initially rotated at a rate of speed different than that of said drum, the internal surface of said drum being recessed to afford a pair of spaced shoulders, a locking bolt carried by said core and movable responsive to centrifugal force resulting from rotation thereof into the opening between said shoulders for interconnecting said core and drum, one of said shoulders being projected with respect to the other of said shoulders for causing said bolt to jump the opening between said shoulders until the relative rotation between said core and drum is substantially eliminated.

2. Transmission mechanism having a centrifugally actuated clutch having a drum-shaped clutch member, a core clutch member initially rotatable at a different rate than that of said drum clutch member, said drum-shaped clutch member including a plurality of relatively movable cylinders, means for limiting the relative movement between said cylinders, each of said cylinders being provided with a recessed portion, said portions being in alignment when said cylinders are in one position with respect to each other to provide a bolt-engaging recess, one of said cylinders being movable to a position where said recess portions are not in alignment when one of said clutch members is rotating at a rate in excess of the other of said clutch members, a bolt carried by said core clutch member and movable into said recess when the relative rotation between said clutch members has been substantially eliminated.

3. Transmission mechanism having a centrifugally actuated clutch including a drum clutch member having a driving shoulder, a core clutch member nested within said drum member and initially rotated at a lower rate than that of said drum, a bolt carried by said core clutch member and movable responsive to centrifugal force resulting from the rotation thereof for engagement with said driving shoulder, said drum including an annular member having a limited amount of movement relative thereto and movable by the relative rotation between said drum and said core to cover said driving shoulder for holding said bolt out of engagement therewith, said annular member being movable incidental to a deceleration of the rotative speed of said drum to approximately that of said core for uncovering said driving shoulder to permit the engagement of said bolt therewith.

4. Transmission mechanism having a centrifugally actuated clutch having a drum clutch member, a core clutch member nested within said drum member, one of said clutch members being initially rotatable at a different rate than that at which the other of said clutch members is driven, said drum being provided with a bolt-engaging recess, a bolt carried by said core and movable responsive to centrifugal force resulting from rotation thereof into engagement with said recess for connecting said core and said drum together, means associated with said bolt and operable for preventing the engagement thereof with said recess until the relative rotation between said drum and said core has been substantially eliminated, and a plate carried by said drum and operable for deflecting oil in which said drum is rotatable into said recess.

5. Transmission mechanism having a centrifugally actuated clutch including a drum, a core nested within said drum and being adapted to be driven initially at a rate different than that of said drum, a driving shoulder provided on said drum, a bolt mounted on said core and movable responsive to centrifugal force resulting from the rotation thereof at a predetermined rate to engage said shoulder for interconnecting said core and drum, and a beveled surface formed on the internal surface of said drum cooperable with said bolt during such time as relative rotation exists between said core and said drum for holding said bolt out of operative engagement with said shoulder until the relative rotation between said drum and said core has been substantially eliminated.

6. Transmission mechanism having in combination driving and driven shafts with a centrifugal clutch operable for providing a driving connection between said shafts and including a clutch member operatively associated with each of said shafts and rotatable initially at relatively different rates, one of said clutch members being provided with a centrifugally operable bolt, the other of said clutch members being provided with a bolt-engaging recess, one of said clutch members including a member having a limited amount of movement relative thereto, said member being movable by the relative rotation between said clutch members to cover said bolt-engaging recess for holding said bolt out of engagement therewith, and being movable incidental to deceleration of the rotative speed of the faster rotating of said clutch members for uncovering said bolt-engaging recess to permit the engagement of said bolt therewith.

7. Transmission mechanism including a centrifugally actuated clutch having a driven clutch member, a separately driven clutch member adapted to be rotated independently of the first clutch member at a rate of speed different from that of said first member, one of said members having a recess therein defining spaced shoulders, a locking bolt carried by the other of said clutch members and movable responsive to centrifugal force into the space between said shoulders for interlocking said clutch members, one of said shoulders being projected with respect to the other of said shoulders for causing said bolt to jump the space between said shoulders until the relative rotation between said clutch members is substantially eliminated.

8. A centrifugally actuated clutch including a clutch drum provided with a bolt engaging recess, a clutch core nested within said drum and adapted to initially rotate at a speed different than that of said drum, a bolt carried by said core and movable responsive to centrifugal force resulting from the rotation of said core at a predetermined speed to engage in said recess for locking said core to said drum, the drum surfaces adjacent opposite sides of the recess being of different radii, said surfaces being non-obstructive to rotation of the bolt at or above the predetermined speed of the core when the clutch drum and the clutch core are out of synchronism and allowing the bolt to jump the recess until the relative rotation between said drum and core is substantially eliminated.

9. Transmission mechanism including driving and driven shafts with a centrifugally actuated clutch having members separately rotatable with each of said shafts and at relatively different rates initially, a bolt engaging recess provided in one of said clutch members, a bolt carried by the other of said clutch members and operable responsive to centrifugal force resulting from the rotation thereof at a predetermined speed to engage in said recess for locking said clutch members together, and means cooperating with said recess permitting a partial non-locking movement of said bolt in response to centrifugal force at or above the predetermined speed of said other clutch member when said members are out of synchronism, said means allowing a locking engagement of said bolt in said recess when said clutch members are substantially in synchronism.

REX E. KELLER.